Patented July 19, 1949

2,476,912

UNITED STATES PATENT OFFICE 2,476,912

1-ALKYL-4-(N-BENZYL-N-BETA-DIALKYL-AMINOETHYLAMINO)-PIPERIDINES AND THEIR PRODUCTION

Robert H. Reitsema, Kalamazoo, Mich., assignor to The Upjohn Company, Kalamazoo, Mich., a corporation of Michigan No Drawing. Application April 30, 1948,
Serial No. 24,423

4 Claims. (Cl. 260—293)

This invention relates to 1-alkyl-4-(N-benzyl-N - beta - dialkylaminoethylamino) - piperidines and their salts with acids which are useful as therapeutic agents.

The new 1-alkyl-4-(N-benzyl-N-beta-dialkyl-aminoethylamino)-piperidines may be represented by the formula:

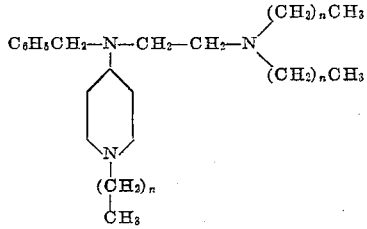

wherein $n$ is zero or a small number from one to eight, inclusive.

The tertiary amines herein described are high-boiling substances which are viscous liquids or solids at room temperature, readily soluble in most common organic liquids, and only slightly soluble in water. The compounds readily form addition salts with mineral acids such as hydrochloric, hydrobromic, and sulfuric; with organic carboxylic acids, such as acetic, lactic, tartaric, and succinic; and strongly acidic phenolic acids such as picric acid. The acid salts are usually water soluble, the hydrochlorides in some instances having such a strong affinity for water that it is difficult to obtain them in anhydrous form. The salts, however, may be readily prepared in aqueous solution.

The compounds of this invention, having three strongly basic tertiary amino groups, are capable of forming salts with from one to three equivalents of an acid. The mono- and di-acid salts may be formed by mixing a stoichiometric quantity of the acid with the free amine and evaporating to dryness. An excess of acid gives only the tri-acid salt of the base. When the salt is used for therapeutic properties, since the therapeutic activity resides in the basic portion of the molecule, the acid groups attached thereto are of significance only in that they should be nontoxic and in that they dilute the effectiveness of the molecule, as determined on a weight basis, in proportion to their number.

The 1-alkyl-4-(N-benzyl-N-beta-dialkylamino-ethylamino)-piperidines may be prepared by the alkylation of a 1-alkyl-4-(beta-dialkylamino-ethylamino)-piperidine with a benzyl halide, preferably benzyl bromide or benzyl chloride. The benzyl group may also contain substituents such as hydroxy, alkoxy, alkyl or amino groups.

The alkylation requires an elevated temperature and an acid-binding agent. In some instances an alkylation catalyst is helpful. The alkylation may be conducted without a diluent, although the use of a diluent, such as toulene, xylene, or cymene is preferred. Various catalysts useful in alkylating amines may be employed, such as finely-divided copper-bronze. Anhydrous metal carbonates or bicarbonates are useful acid-binding agents, those of the alkali metals being preferred. An excess of the starting amine may also be employed for acid-binding purposes. The alkylation is carried out by mixing the reactants together in substantially equimolar proportions with or without a diluent and heating the mixture, a temperature of about 150–170 degrees centigrade being most suitable. The period of heating is not of critical importance, various times from 5 to 50 hours being suitable.

The reaction mixture may be worked up in ways known to the art. After cooling, water may be added and the copper-bronze or other catalyst, if employed, removed by filtration. The early removal of catalyst aids in separation of the water layer from the diluent layer containing most of the product. The water layer is extracted with ether, benzene, toulene or xylene, the organic extract combined with the diluent layer, the combined solutions dried, and the product isolated and purified by distillation. Other ways of recovering the 1-alkyl-4-(N-benzyl-N-beta-dialkylaminoethylamino)-piperidines will be apparent to those familiar with the art.

Acid salts of the amines are prepared in various ways known to the art. If an aqueous solution of the salt is desired, the amino compound may be titrated with acid until the resulting solution has attained the desired pH. If it is desired to isolate the salt, this may be done by evaporating its solution to dryness or a solution of the amine may be reacted with a solution of an acid, the solvent chosen being one in which the amine salt is insoluble, whereupon the insoluble salt precipitates. Many of the salts are quite hygroscopic in nature.

The following examples illustrate the invention but are not to be construed as limiting.

*Example 1.—1-ethyl-4-(N-beta-dimethylamino-ethylamino)-piperidine*

Thirty-four and five-tenths grams of 1-ethyl-4-piperidone [Fuson, Parham and Reed, J. Am. Chem. Soc. 68, 1239 (1946)] and 25.2 grams of beta-dimethylaminoethyl amine were thoroughly mixed at a temperature between 15 and 25 degrees centigrade. To the reaction mixture was then added 100 milliliters of absolute ethyl alcohol and the alcoholic solution reduced at room temperature with hydrogen under pressure (50 pounds per square inch) and Adam's platinum oxide catalyst. Absorption of hydrogen was complete after about two hours, whereupon the catalyst was removed by filtration and the resulting 1 - ethyl - 4 - (N - beta-dimethylaminoethylamino)-piperidine, boiling at 136-139 degrees centigrade at 18 millimeters of mercury pressure, was isolated by distillation. The tripicrate melted at 238.5-239 degrees centigrade with decomposition. In the same manner are prepared the diethylaminoethyl, dipropylaminoethyl, diisopropylaminoethyl, methylethylaminoethyl, and other similar 1-alkyl-piperidines, by substituting the selected amine for beta-diethylaminoethyl amine in the above example.

*Example 2.—1-ethyl-4-(N-benzyl-N-dimethylaminoethylamino)-piperidine*

To a stirred suspension of 58.0 grams of 1-ethyl-4-beta-dimethylaminoethylamino)-piperidine dissolved in 500 milliliters of xylene, 40.2 grams of anhydrous potassium carbonate and 0.5 grams of finely-divided copper-bronze powder, 49.8 grams of benzyl bromide, was added over a period of thirty minutes. After addition of benzyl bromide, the suspension was heated with continued stirring to 150-170 degrees centigrade for about forty hours. Upon cooling to room temperature, 25 milliliters of water was added slowly, copper-bronze catalyst removed by filtration, xylene and water layers separated, and the aqueous layer extracted with ether. The ether extract was combined with the xylene, dried, and 1-ethyl-4-(N-benzyl-N-beta-dimethylaminoethylamino)-piperidine obtained as a viscous oil boiling at 185-188 degrees centigrade 0.7 millimeters of mercury by removal of solvent. The solid, which partially crystallized from the oil in the receiver, melted at 99-100 degrees centigrade.

The hydrochloride was obtained by mixing an ether solution of 1-ethyl-4-(N-benzyl-N-beta-dimethylaminoethylamino) - piperidine with an ether solution containing the quantity of hydrogen chloride calculated to form the trihydrochloride. A hygroscopic solid was obtained upon removal of the solvent, on which a definite melting point could not be determined. The tripicrate, after crystallization from ethyl acetate, melted at 193-195 degrees centigrade with decomposition.

*Example 3.—1-methyl-4-(N-benzyl-N-beta-diethylaminoethylamino)-piperidine*

In the same manner as given for Example 2, equimolar quantities of 1-methyl-4-(N-beta-diethylaminoethylamino)-piperidine and benzyl bromide are heated in xylene in the presence of potassium carbonate and a copper-bronze catalyst to yield the desired 1-methyl-4-(N-benzyl-N - beta - diethylaminoethylamino) - piperidine, which may be separated as a high-boiling viscous liquid and converted to acid salts such as the tripicrate, by the procedure indicated in the foregoing.

Other compounds within the scope of the invention which may be prepared according to the given procedure by reacting a benzyl halide and the selected 1-alkyl-4-(N-beta-dialkylaminoethylamino)-piperidine are the 1-methyl-, 1-propyl-, 1-isopropyl-, 1-butyl-, 1-amyl-, and like 4-(N-benzyl-N-beta-dimethylaminoethylamino)-piperidines, 4-(N-benzyl - N - beta-diethylaminoethylamino)-piperidines, 4-(N-benzyl-N-beta - dipropylaminoethylamino)-piperidines, 4 - (N-benzyl-N-beta-diisopropylaminoethylamino)-piperidines, 4 - (N - benzyl-N-beta-dibutylaminoethylamino) - piperidines, 4-(N-benzyl-N-beta-methylethylaminoethylamino)-piperidines, and acid salts thereof.

Various modifications may be made in the present invention without departing from the spirit or scope thereof, and it is to be understood that I limit myself only as defined by the appended claims.

I claim:

1. A compound selected from the group consisting of (a) 1-alkyl-4-(N-benzyl-N-beta-dialkylaminoethylamino)-piperidines, wherein the alkyl groups contain from one to eight carbon atoms, inclusive, and (b) acid salts thereof.

2. 1-ethyl-4-(N-benzyl-N-beta-dimethylaminoethylamino)-piperidine.

3. 1-ethyl-4-(N-benzyl-N-beta-dimethylaminoethylamino)-piperidine tripicrate.

4. The process for the preparation of a 1-alkyl-4-(N-benzyl-N-beta - dialkylaminoethylamino) - piperidine which includes the step of heating a 1-alkyl-4-(N-beta - dialkylaminoethylamino)-piperidine with a benzyl halide, selected from the group consisting of the bromide and chloride, in the presence of an acid binding agent to produce a 1-alkyl-4-(N-benzyl-N-beta-dialkylaminoethylamino)-piperidine.

ROBERT H. REITSEMA.

No references cited.